(12) United States Patent
Cherry, Sr.

(10) Patent No.: US 6,770,108 B2
(45) Date of Patent: Aug. 3, 2004

(54) FILTER HOUSING

(75) Inventor: John L. Cherry, Sr., Washington, NC (US)

(73) Assignee: Camfil Farr, Inc., Rancho Dominguez, CA (US)

( * ) Notice: Subject to any disclaimer, the term of this patent is extended or adjusted under 35 U.S.C. 154(b) by 168 days.

(21) Appl. No.: 10/119,633

(22) Filed: Apr. 10, 2002

(65) Prior Publication Data

US 2003/0192822 A1 Oct. 16, 2003

(51) Int. Cl.[7] .............................................. B01D 46/00
(52) U.S. Cl. ................ 55/385.2; 52/506.05; 52/506.08; 55/502; 55/DIG. 31; 210/435; 210/450; 210/451; 454/187
(58) Field of Search ......................... 52/506.05, 506.08, 52/385.2, 502, 504, 505, DIG. 31; 210/435, 450, 451; 454/187

(56) References Cited

U.S. PATENT DOCUMENTS 4,088,463 A * 5/1978 Smith ......................... 55/502
4,371,386 A * 2/1983 DeVecchi ..................... 55/502
6,351,920 B1 * 3/2002 Hopkins et al. ........... 52/506.08

FOREIGN PATENT DOCUMENTS

JP          11141940 A * 5/1999 ........... B01D/46/00

* cited by examiner

Primary Examiner—David A. Reifsnyder
(74) Attorney, Agent, or Firm—Moser, Patterson & Sheridan, LLP; Keith P. Taboada, Esq.

(57) ABSTRACT

A filter housing for retaining a roomside replaceable filter is generally provided. In one embodiment, the filter housing includes one or more sidewalls defining an interior volume. Each sidewall includes a first section and an adjacent second section sealingly coupled thereto. A sealing member is coupled to the second section and extends into the interior volume. The sealing member is adapted to provide a gastight seal between with a replaceable filter and the filter housing. A hole is disposed through at least one of the first or second sections. The first section is sealed to the second section around a perimeter of the hole.

20 Claims, 5 Drawing Sheets

FILTER HOUSING

BACKGROUND OF THE DISCLOSURE

1. Field of the Invention

The embodiments of the present invention relate generally to a filter housing.

2. Background of the Invention

Cleanrooms are utilized in many industries for contamination control and to improve product yields. A plurality of filters, typically mounted in the ceiling of the cleanroom, are configured to remove particulate from air entering the cleanroom at a predetermined efficiency selected based upon the cleanliness requirements of the activities performed in the cleanroom. As particulates load the filtration media disposed in the filter, the airflow through the filter decreases as the pressure drop across the filter increases. Once the filter reaches a critical pressure drop, the filter is typically replaced.

On other applications, replacement of filters is scheduled based on time or processes performed within the cleanroom. For example, in many pharmaceutical and biotech cleanrooms, periodic replacement of filters is required to meet regulatory or owner specifications. To facilitate efficient replacement of the filter, a housing is typically mounted in the cleanroom ceiling in which the filter may be readily removed and replaced.

During the installation of such housings, a hole is frequently drilled through the housing to facilitate mounting or to provide an attachment point for a trim ring commonly used to cover the interface between the ceiling and housing. Fasteners, disposed through the hole, are typically caulked from the cleanroom side to prevent unfiltered air from reaching the downstream side of the filter.

However, seal provided around the fastener is a potential leak path, which may leak due to improper application of the sealing material (e.g., caulk), or by damaging the sealing material during screen or filter installation or replacement. Particularly, if the holes through the housing are in communication with the upstream side of the filters which is at a higher pressure than the cleanroom, unfiltered air may be driven through the hole and into the cleanroom. Thus, it would be desirable for a housing to accommodate mounting holes that are isolated from the pressurized regions of the filter housing that contain unfiltered air.

Therefore, there is a need for an improved filter housing.

SUMMARY OF THE INVENTION

A filter housing for retaining a roomside replaceable filter is provided. In one embodiment, the filter housing includes one or more sidewalls defining an interior volume. Each sidewall includes a first section and an adjacent second section sealingly coupled thereto. A sealing member is coupled to the second section and extends into the interior volume. The sealing member is adapted to provide a gas-tight seal with a replaceable filter. A hole is disposed through at least one of the first or second sections. The first section is sealed to the second section around a perimeter of the hole to prevent unfiltered air from entering a cleanroom through the hole.

In another embodiment, a filter housing includes a first sidewall section coupled between a sealing member and a second sidewall section. The sealing member is adapted to provide a gas-tight seal with a replaceable filter element. A barrier ring circumscribes a pass through area formed in at least one of the first sidewall section or second sidewall section. The barrier ring fluidly isolates the pass through area from an interstitial space defined between the first sidewall section and the second sidewall section.

In another embodiment, a filter housing includes a plurality of sidewalls, each sidewall formed of a singular sheet of material and having an outer section coupled to an inner section. A sealing member is coupled to the inner section and adapted to provide a gas-tight seal with a replaceable filter element. A hole formed in the outer sidewall is circumscribed by a fluid seal disposed between the outer section and the inner section.

BRIEF DESCRIPTION OF THE DRAWINGS

A more particular description of the invention, briefly summarized above, may be had by reference to the embodiments thereof that are illustrated in the appended drawings. It is to be noted, however, that the appended drawings illustrate only typical embodiments of this invention and, therefore, are not to be considered limiting of its scope, for the invention may admit to other equally effective embodiments.

To facilitate understanding, identical reference numerals have been used, where possible, to designate identical elements that are common to the figures.

DETAILED DESCRIPTION

Figure 1:
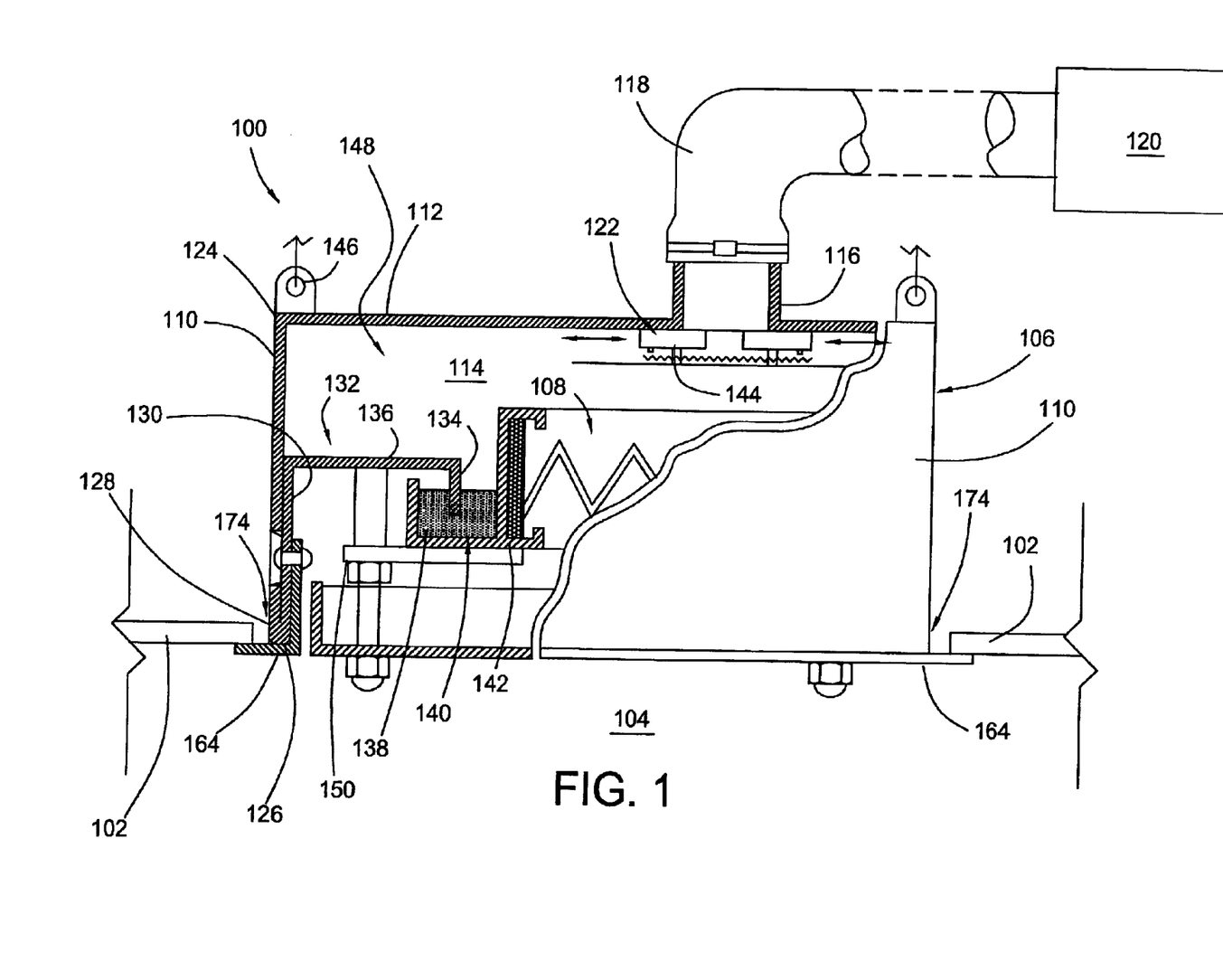
FIG. 1 depicts a simplified, partial sectional view of one embodiment of a filter housing having a filter retained therein mounted in a ceiling.

FIG. 1 depicts a sectional view of one embodiment of a filter module 100 disposed in a ceiling 102 of a cleanroom 104. Typically, additional filter modules 100 (not shown) are utilized in predetermined positions within the cleanroom 104 to provide predetermined levels of cleanliness and ventilation. The filter module 100 generally includes filter housing 106 that retains a removable filter 108. The scale of FIG. 1 has been exaggerated for clarification of the interface between the housing 106 and the filter 108. The filter housing 106 includes a plurality of sidewalls 110 and a backplate 112 that define an interior volume 114. It is also contemplated that cylindrical housings may utilize a single sidewall 110.

The backplate 112 includes a collar 116 to facilitate coupling the filter housing 106 to a duct 118 that supplies air from an air handler 120. The air handler 120 provides flow control of the air provided to the filter module 100. The air handler 120 includes one or more blowers or fans (not shown) and may additionally include pre-filtration elements such as ASHRAE or HEPA filters.

A damper 122 is mounted behind the backplate 112 in the interior volume 114 of the housing 106. The damper 122 controls the flow of air into the interior volume 114 of the housing 106. The damper 122 may be closed to substantially stop the air flowing into the housing 106 during replacement of the filter 108. The damper 122 may also be incrementally opened to balance the air flowing into the cleanroom 104 among other filters (not shown) providing air to the cleanroom 104. The damper 122 may include a diffuser plate 144 for enhancing flow uniformity through the filter 108 coupled to the housing 106.

The sidewalls 110 of the housing 106 are generally fabricated from metals, such as aluminum, stainless steel, plastic, or glass reinforced plastic, among others. The sidewalls 110 are generally configured in a polygonal form, typically square or rectangular.

The sidewalls 110 are sealingly coupled together at their intersections, for example, by welding, soldering, adhering, bonding, caulking and the like. The backplate 112 is generally coupled to the sidewalls 110 in a similar fashion to make the housing 106 leak-tight. It is also contemplated that the housing 106 may be utilized in open plenum applications that do not utilize a backplate 112.

Each sidewall 110 includes a first end 124 coupled to the backplate 112 and a second end 126 that interfaces with the cleanroom ceiling 102. The first end 124 of the sidewall 110 and/or backplate 112 generally includes a mounting pad or tab 146 that facilitates coupling the housing 106 to a supporting structure (not shown) above the cleanroom 104. The sidewalls 110 have a double wall that includes an inner section 130 disposed against at least a portion of an outer section 128. In the embodiment depicted in FIG. 1, the outer section 128 is disposed between the first end 124 and the second end 126 while the inner section 130 extends from the second end 126 along a portion of the outer section 128 to a sealing section 132. The outer and inner sections 126, 130 are sealingly joined at the second end 126, and in one embodiment, are fabricated from a continuous piece or sheet of material where the outer section 128 is folded at the second end 128 and transitions into the inner section 130.

In one embodiment, the sealing section 132 includes a knife edge 134 that is coupled to the inner section 130 by a flange 136. Typically, the knife edge 134 and flange 136 are fabricated from a single piece of material, and may also be fabricated with the inner section 130 of the sidewall 110 as a continuous piece of material. The knife edge 134 is orientated substantially perpendicular to the sidewall. 110 and is configured to interface with a sealing element 138 disposed at one end of the filter 108 to create an air tight seal between the filter housing 106 and the filter 108. Thus, the sealing section 132 separates the interior volume 114 of the housing 106 into a plenum. 148 upstream of the filter 108 and a downstream or roomside. In other words, the filter 108 interfacing with the sealing section 132 separates the unfiltered air upstream of the filter 108 with the clean, filtered air, downstream of the filter 108 that enters the clean room 104.

In the embodiment depicted in FIG. 1, the sealing element 138 is a silicon or polyurethane gel disposed in a trough 140 formed in a frame 142 of the filter 108. The knife edge 134 penetrates the gel to create an air seal between the filter 108 and housing 106. Filter performance (i.e., efficiency, pressure drop) is generally selected based on filtering and resistance criteria needed for a particular application to be performed in the cleanroom 104. Filters manufactured for this use are commercially available, e.g., from CAMFIL-FARR, located in Riverdale, N.J.

Figure 2:
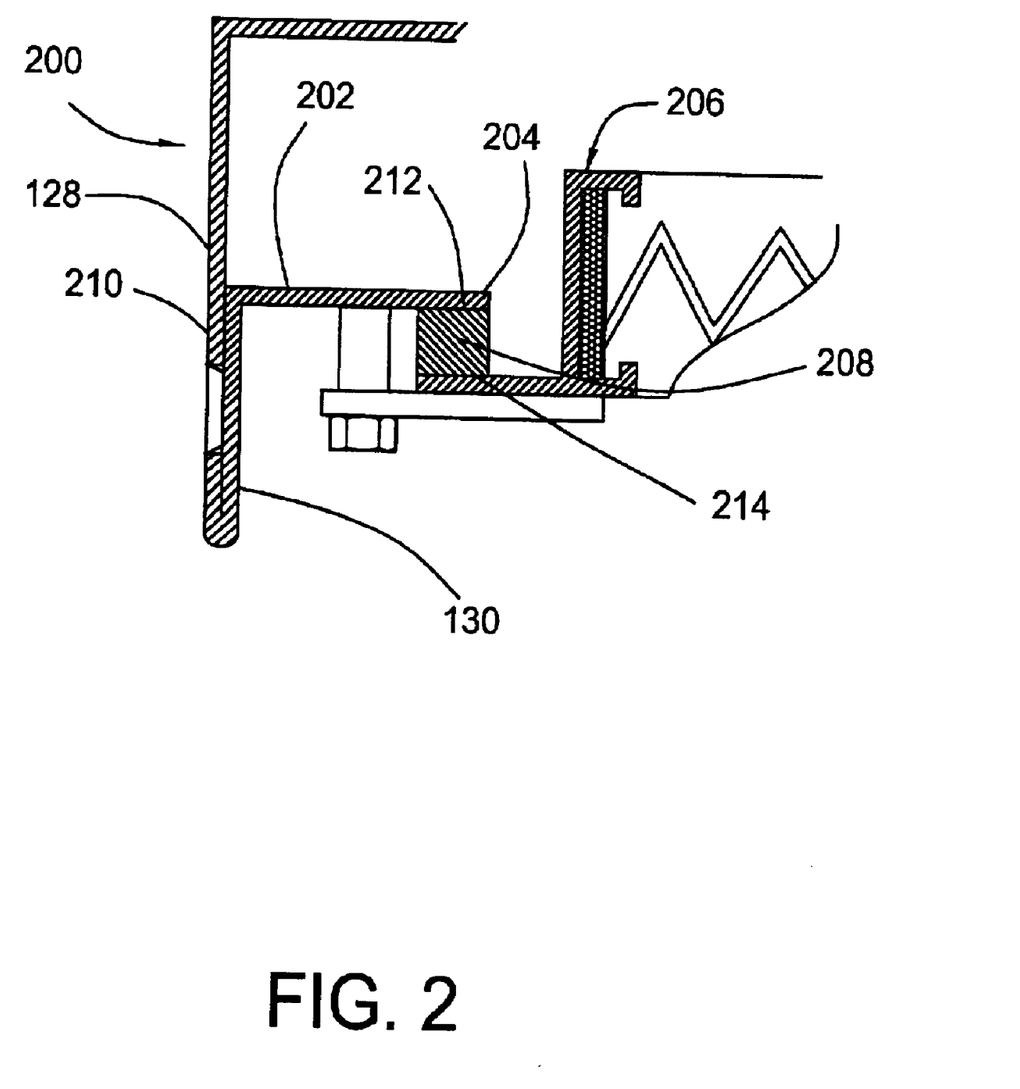
FIG. 2 is an alternative embodiment of a sealing section of a filter housing.

FIG. 2 depicts another embodiment of a housing 200 having an alternative sealing section 202. Sidewalls 210 of the housing 200 are generally similar to the sidewalls 110 described above with reference to FIG. 1. The sealing section 202 includes a flange 204 that extends perpendicularly inward from the inner section 130 of the sidewall 210 to provide a planar seating surface 212. A filter 206 having a gasket 208 disposed on top of a portion of a filter frame 214 is urged against the flange 204, thereby compressing the gasket 208 against the flange 204 to provide a seal between the housing 200 and filter 206.

Figure 3:
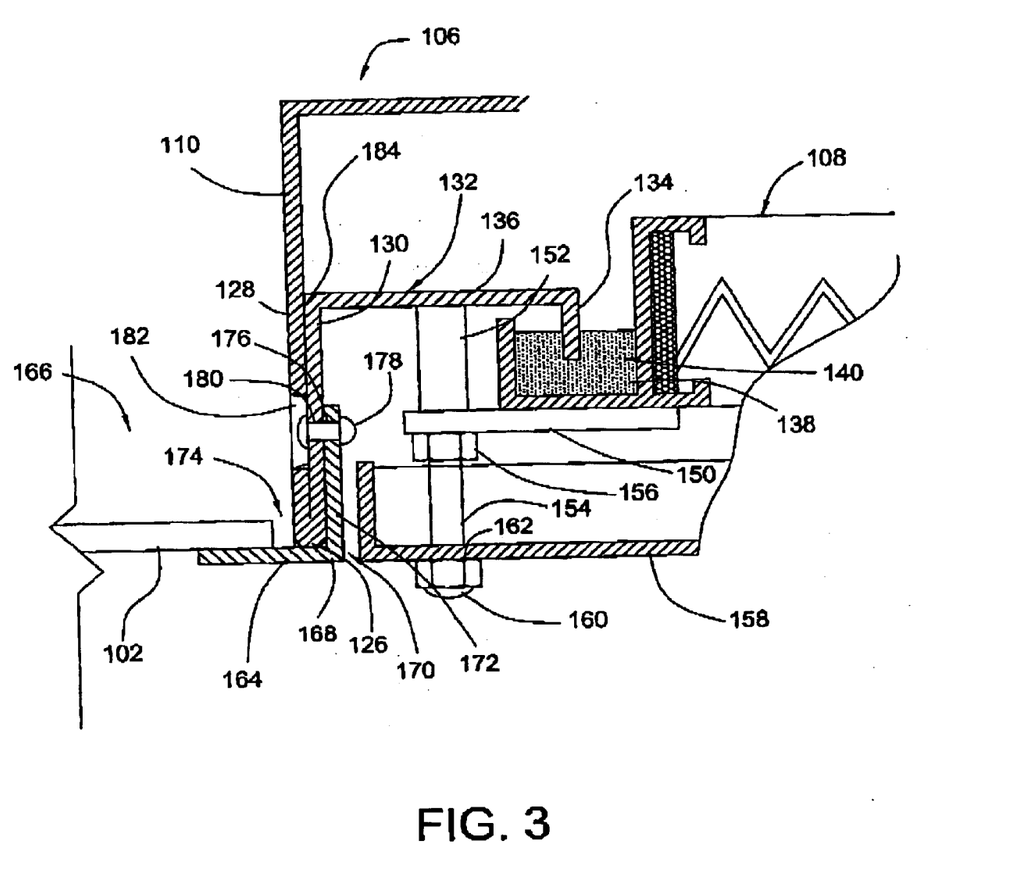
FIG. 3 is a sectional view of one embodiment of a sidewall of the filter housing of FIG. 1.

FIG. 3 depicts a partial sectional view of the filter module 100 illustrating the attachment of the filter 108 to the housing 106. The filter 108 is secured to the housing 106 by a pawl tab 150 mounted on a standoff 152 coupled to the flange. The pawl tab 150 may be rotated about a stud 154 extending from the standoff 152 to provide clearance for removing/replacing the filter 108. Once the filter 108 is inserted into the housing 106, the pawl tab 150 is rotated to capture the filter 108 against the flange 136 (as shown). A locking nut 156 threaded on the stud 154 secures the pawl tab 150 in position.

The stud 154 may optionally extend to about the second end 126 of the sidewalls 110 to facilitate coupling a perforated or expanded screen 158 across the open end of the housing 106. The screen 158 has a plurality of mounting holes 162 configured to accept the studs 154. An acorn nut 160 or other fastener is coupled to the stud 154 to secure the screen 158 to the housing 106.

A trim ring 164 is disposed between the screen 158 and the housing 106 to cover the interface of the housing 106 and ceiling 102 of the cleanroom 104. Caulk, or other sealant (not shown) may be applied between the trim ring 164 and ceiling 102 to prevent leakage between the cleanroom and an unfiltered area 166 above the ceiling 102. Preferably, the pressure in the cleanroom 104 is greater than the pressure in the area 166 to prevent leakage from the area 166 into the cleanroom 104.

The trim ring 164 is generally comprised of stainless steel, aluminum or other rigid material. The trim ring 164 is comprised of a picture frame 168 defining an aperture 170 and having a flange 172 extending into the aperture 170 substantially perpendicular to the picture frame 168. In the embodiment depicted in FIG. 1, the picture frame 168 is rectangular. The picture frame 168 is configured to extend from an inner surface of the inner section 130 of the sidewall 110 to cover a hole 174 in the ceiling 102 in which the housing 106 is mounted.

The flange 172 is disposed against the inner surface of the sidewalls 110 when the trim ring 164 is mounted to the housing 106. The flange 172 includes a plurality of mounting holes 176 formed therein to facilitate coupling the trim ring 164 to the housing 106. A fastener 178, such as a rivet, self-tapping screw or other device is disposed through the mounting hole 176 of the trim ring 164 and into the sidewall 110 to secure the trim ring 164. A mounting hole 180 for the fastener 178 is typically formed through the inner section 130 of the sidewall 110 at installation by drilling or use of a self-tapping screw.

To ensure that the mounting hole 180 does not provide a leak path for contaminants to enter the cleanroom 104, the sidewalls 110 are configured with barrier rings 182 that align with the mounting holes 176 of the trim ring 164. The barrier rings 182 separate the mounting holes 180 in the sidewalls 110 from the unfiltered air in residing in an interstitial space 184 between the inner and outer sections 130, 128 of the sidewalls 110 that is in communication with the plenum 148 of the housing 106. Thus, the barrier rings 182 prevent pressurized air within the plenum 148 from leaking through the interstitial space 184 between inner and outer sections 130, 128 of the sidewalls 110 through the mounting hole 180 and entering the cleanroom 104.

Figure 4A:
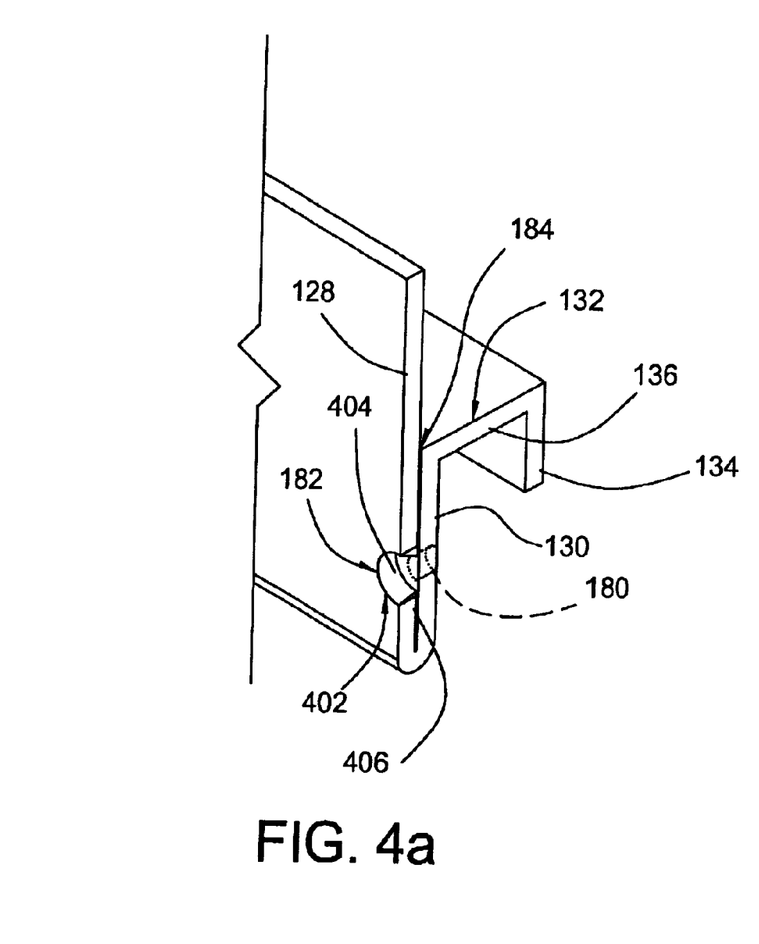
FIG. 4A is one embodiment of a barrier ring.

FIG. 4A depicts one embodiment of a barrier ring 182. The barrier ring 182 is formed by sealingly isolating a predefined fastener pass through area 402 through which the fastener 178 (shown in FIG. 3) passes through the hole 180 (shown in phantom) in the sidewall 110 from the interstitial space 184 between the inner and outer sections 130, 128 of the sidewall 110. The pass through area 402 is generally configured to align with the mounting holes 174 provided in the trim ring 164. As the barrier ring 182 circumscribes the pass through area 402, the hole 180 formed in the area 402 is fluidly isolated from the plenum 148, thus preventing contamination of the cleanroom 104 downstream of the filter 108. The fastener 178 is usually caulked to provide an extra measure of protection, even in applications where the pressure above the ceiling 102 is lower than the pressure within the cleanroom 104.

In the embodiment depicted in FIG. 4A, the barrier ring 182 is formed by a weld 404 joining a circumference of a clearance hole 406 formed in the outer section 128 of the sidewall 110 to a surface of the inner section 130 facing the outer section 128. The clearance hole 406 is located over the pass through area 402 of the inner section 130 of the sidewall 110 (i.e., is covered by the inner section 130 of the sidewall 110). The clearance hole 406 generally has a diameter sufficient to ensure the hole 180 formed in the pass through area 402 (that aligns with the hole 174 in the trim ring 164) provides ample clearance with the weld 404, thereby ensuring an air-tight barrier between the interstitial space 184 between the sections 128, 130 and the hole 180. In one embodiment, the diameter of the clearance hole is at least greater than about 0.75 inches, and preferably greater than about 1.0 inch to account for tolerances between the location of the hole 176 in the trim ring 164 and the center of the pass through area 402. Alternatively, the clearance hole 406 may be formed in the inner section 130.

Alternatively, caulk or other sealing material may be used in place of the weld 404. As the caulk is disposed at the circumference of the clearance hole 406, the caulk remains undisturbed during drilling or screwing through the pass through area 402, thereby ensuring isolation of the interstitial space 184 between the inner and outer sections 130, 128 and the hole 180 created by or for the fastener 178 through the sidewall 110 from the cleanroom 104.

Figure 4B:
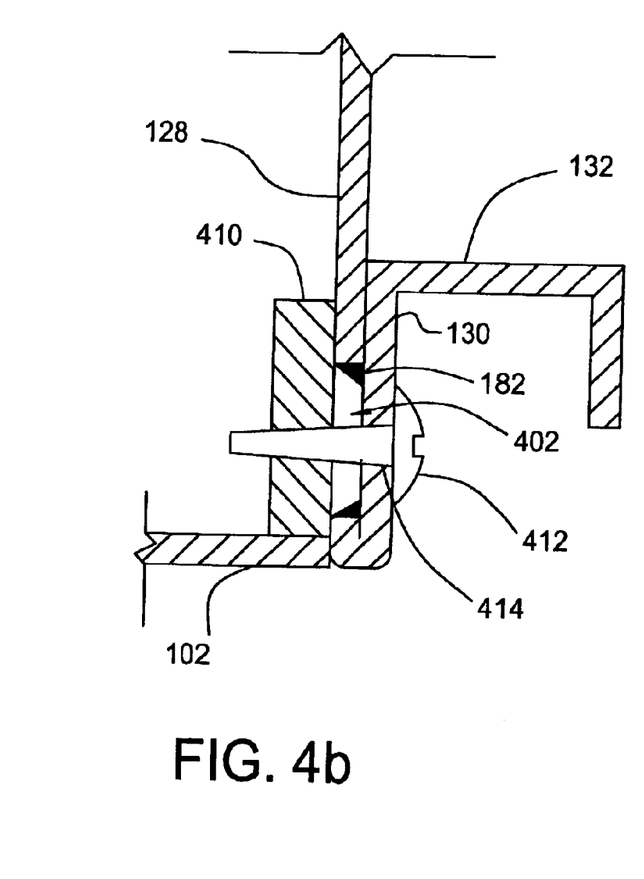
FIG. 4B depicts a housing coupled to a frame in the ceiling through a pass through area defined by a barrier ring.

Additionally, the barrier ring 182 may be utilized, alone or in conjunction with fastening the trim ring 164 to the housing 106, to fasten the housing 106 to a frame 410 constructed in the ceiling 102 as depicted in FIG. 4B. A fastener 412, such as a screw, bolt or other fastening device, is inserted through a hole 414 formed in the pass through area 402 and into the frame 410 circumscribing the housing. As the barrier ring 182 provides a gas seal between the sections 130, 128 of the sidewalls 110, leakage from the plenum 148 into the cleanroom 104 through the hole 414 provided for the fastener 412 is prevented.

Figure 5:
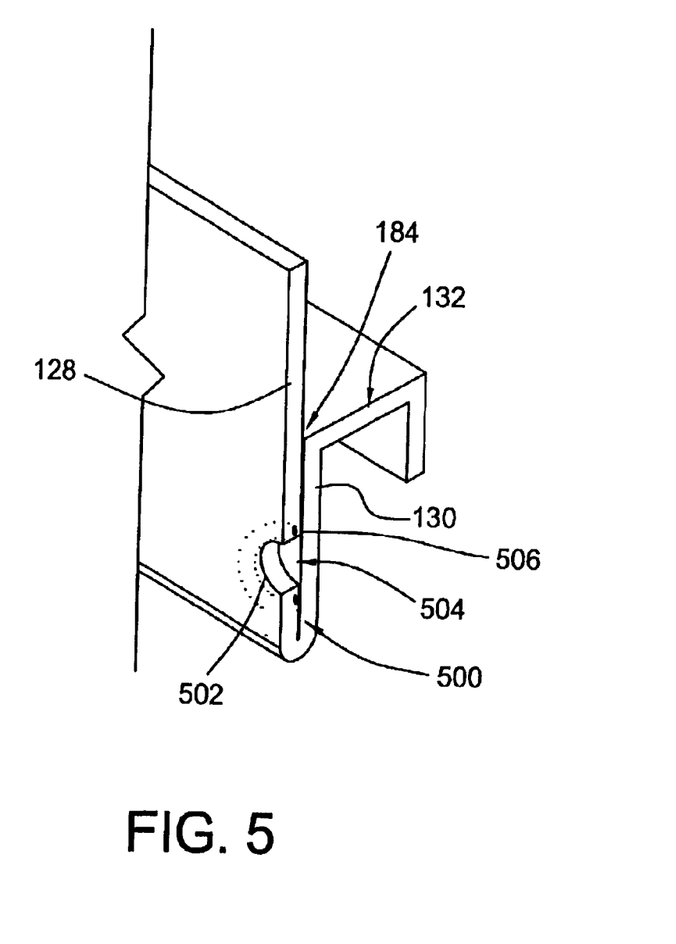
FIG. 5 is another embodiment of a barrier ring.

FIG. 5 depicts another embodiment of a barrier ring 500. The barrier ring 500 generally includes a clearance hole 502 formed in the outer section 128 of the sidewall 110 around a pass through area 504 defined in the inner section 130. The clearance hole 502 is generally similar to the clearance hole 406 described with reference to FIG. 4. A sealing material 506, such as braze, solder, adhesives, caulks, gaskets (i.e., flat, custom or o-ring) or other material for providing a gas barrier is disposed between the facing surfaces of the inner and outer sections 130, 128 of the sidewalls 110 to prevent fluid communication between the pass through area 504 through which the hole 180 is formed and the interstitial space 184.

Figure 6:
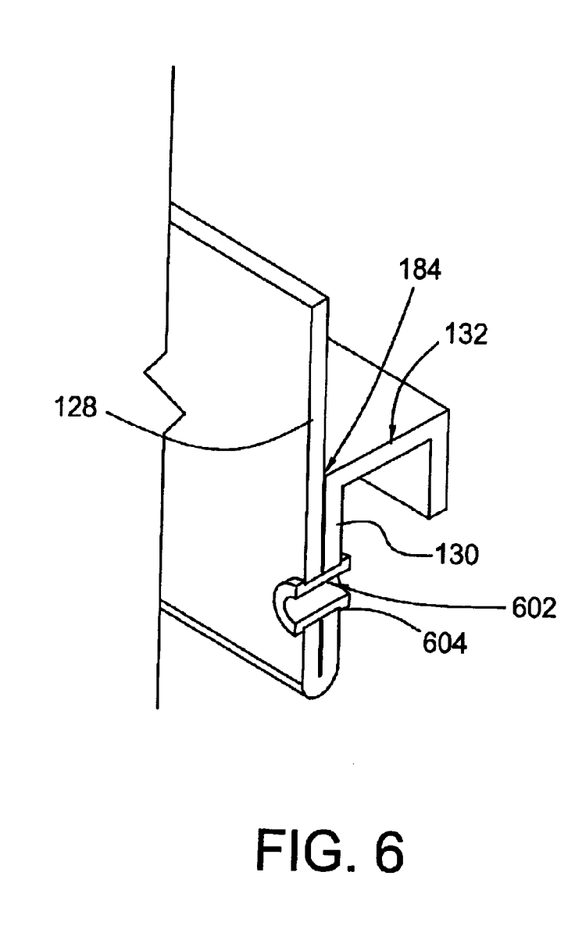
FIG. 6 is another embodiment of a barrier ring.

FIG. 6 depicts another embodiment of a barrier ring 600. The barrier ring 600 generally includes a plurality of holes 602 (one is shown in FIG. 6) formed through the inner and the outer sections 130, 128 of the sidewall 110. The holes 602 are configured to align with the mounting holes of the trim ring (not shown). A grommet 604 is disposed in the hole 602. The grommet 604 provides a seal between the interstitial space 184 between the facing surfaces of the inner and outer sections 130, 128 of the sidewall 110. The grommet 604 may provide the seal by compressing the inner and outer sections together, by urging radially against the inner and outer sections, or by seals such as o-rings or sealant disposed between the inner and outer sections 130, 128 and the grommet 604.

Thus, a filter housing is provided that uses a barrier ring to facilitate coupling of a trim ring to the housing without creating a leak path between the plenum behind the filter and the cleanroom. Moreover, the barrier ring may be utilized to directly mount the housing to the ceiling of the cleanroom.

Although various embodiments which incorporate the teachings of the present invention have been shown and described in detail herein, those skilled in the art can readily devise many other varied embodiments that still incorporate these teachings.

What is claimed is:

1. A filter housing comprising:
   one or more sidewalls defining an interior volume, each sidewall comprising;
   a first section having a first edge;
   a second section disposed adjacent the first section and sealingly joined to the first section;
   a sealing member coupled to the second section and extending into the interior volume, the sealing member adapted to provide a gas-fight seal between a replaceable filter and the second section; and
   a hole disposed through at least one of the first or second sections, where the first section is sealed to the second section around a perimeter of the hole.

2. The filter housing of claim 1, wherein four sidewalls define the interior volume.

3. The filter housing of claim 1, wherein the perimeter of the hole is welded to the adjacent first or second section of the sidewall.

4. The filter housing of claim 1, wherein the perimeter of the hole is sealingly caulked to the adjacent first or second section of the sidewall.

5. The filter housing of claim 1, wherein the hole is at least greater than about 0.75 inches in diameter.

6. The filter housing of claim 1, wherein the first section and the second section of the sidewall are brazed, soldered, adhered, caulked or gasketed around the perimeter of the hole.

7. The filter housing of claim 1, wherein the first section and the second section are formed from a single continuous member.

8. A filter housing comprising:
   a first sidewall section;
   a second sidewall section coupled to the first sidewall section;
   a sealing member coupled to the sidewall section and adapted to provide gas-tight seal between a replaceable filter element and the first sidewall section; and
   a barrier ring circumscribing a pass through area formed in at least one of the first sidewall section or the second sidewall section, the barrier ring fluidly isolating the pass through area from an interstitial space defined between the first sidewall section and the second sidewall section.

9. The filter housing of claim 8, wherein the barrier ring further comprises:

a hole formed through the first sidewall section and having a perimeter welded to the second sidewall section.

10. The filter housing of claim 8, wherein the barrier ring further comprises:

a hole formed through the first sidewall section and having a perimeter caulked to the second sidewall section.

11. The filter housing of claim 8, wherein the barrier ring further comprises:

a hole formed through the first sidewall section; and a braze solder adhesive, gasket or caulk disposed between the first sidewall section and the second sidewall section and sealingly circumscribing the hole.

12. The filter housing of claim 8, wherein the first sidewall section and the second sidewall section are formed from a single continuous member.

13. The filter housing of claim 8 further comprising a backplate having an inlet collar coupled to the second sidewall section.

14. The filter housing of claim 13 further comprising a damper coupled adjacent the inlet collar and adapted to control flow therethrough.

15. A filter housing comprising:

a plurality of sidewalls, each sidewall formed of a singular sheet of material and having an outer section coupled to an inner section;

a sealing member coupled to the inner section and adapted to provide a gas-tight seal between with a replaceable filter element and the inner section;

a hole formed in the outer section; and a fluid seal disposed between the outer section and the inner section and circumscribing the hole.

16. The filter housing of claim 15, wherein the fluid seal is a weld, braze, adhesive or caulk.

17. The filter housing of claim 15 further comprising a backplate having an inlet collar coupled to the outer section.

18. The filter housing of claim 15 further comprising a screen removably coupled to the sealing member.

19. The filter housing of claim 15, wherein the sealing member further comprises a knife edge adapted to penetrate a gel disposed in the filter.

20. The filter housing of claim 15, wherein the hole is covered by the inner section.

\* \* \* \* \*

UNITED STATES PATENT AND TRADEMARK OFFICE
CERTIFICATE OF CORRECTION

PATENT NO. : 6,770,108 B2
DATED : August 3, 2004
INVENTOR(S) : John L. Cherry, Sr.

It is certified that error appears in the above-identified patent and that said Letters Patent is hereby corrected as shown below:

Column 3,
Line 31, please change "sections 126, 130" to -- sections 128, 130 --.
Line 35, please change "second end 128" to -- second end 126 --.

Column 8,
Line 6, please delete "with" in "between with a replaceable".

Signed and Sealed this

First Day of March, 2005

JON W. DUDAS
*Director of the United States Patent and Trademark Office*